(12) United States Patent
Buss

(10) Patent No.: US 6,205,706 B1
(45) Date of Patent: Mar. 27, 2001

(54) SELF-WATERING PLANTING RESERVOIR

(75) Inventor: Melvin H. Buss, Burlington, VT (US)

(73) Assignee: America's Gardening Resource, Inc., Burlington, VT (US)

( * ) Notice: Subject to any disclaimer, the term of this patent is extended or adjusted under 35 U.S.C. 154(b) by 0 days.

(21) Appl. No.: 09/464,115

(22) Filed: Dec. 16, 1999

Related U.S. Application Data

(60) Provisional application No. 60/112,460, filed on Dec. 16, 1998.

(51) Int. Cl.$^7$ .................................................... A01G 29/00
(52) U.S. Cl. ............................................ 47/48.5; 47/79
(58) Field of Search .......................... 47/48.5, 79, 40.5

(56) References Cited

U.S. PATENT DOCUMENTS

| | | |
|---|---|---|
| 262,379 | 8/1882 | Dean . |
| 283,966 | 8/1883 | Chappell . |
| 2,492,152 | 12/1949 | Hollowell ................................. 47/38 |
| 2,865,137 | 12/1958 | Longacre ................................. 47/38 |
| 3,739,523 | 6/1973 | Tuffli ..................................... 47/38.1 |
| 4,346,532 | 8/1982 | Peterson ................................... 47/66 |
| 4,745,707 | * 5/1988 | Newby ..................................... 47/79 |
| 4,756,121 | 7/1988 | Wild ....................................... 47/80 |
| 4,993,186 | 2/1991 | Immonen ................................. 47/79 |
| 5,411,562 | 5/1995 | Saparzadeh .............................. 47/58 |
| 5,921,025 | * 7/1999 | Smith ..................................... 47/79 |

\* cited by examiner

*Primary Examiner*—Michael J. Carone
*Assistant Examiner*—Joanne C. Downs
(74) *Attorney, Agent, or Firm*—Downs Rachlin & Martin PLLC

(57) ABSTRACT

A self-watering reservoir (21) which is placed in a planter (31) and buried in soil (32) of the planter. The reservoir consists of a container (23) that holds water in a chamber (27) and a lid (22) to cover the container. The lid has an opening (24) through which a tube (30) can be inserted, the tube runs up to the surface of the soil in the planter and allows the addition of water to the reservoir as needed. The reservoir also includes a well (26) that projects down into the container. The well is open at its top and the bottom of the well has a first section (28B) which rests on the bottom surface of the container and a second section (28A) which projects up and away from the first section at an angle. The second section has an opening (29). When the reservoir is buried in a planter, soil in the planter fills the well and comes in contact with water in the chamber through the opening in the second section of the well, and thus water is transported through soil in the well to soil surrounding the reservoir.

10 Claims, 3 Drawing Sheets

SELF-WATERING PLANTING RESERVOIR

This application claims the benefit of U.S. Provisional Application No. 60/112,460, filed Dec. 16, 1998.

FIELD OF INVENTION

The present invention relates to devices for watering plants and, more particularly, to devices that provide a constant and even amount of water to a plant over a substantial period of time.

BACKGROUND OF THE INVENTION

Plants, whether in the ground or in pots, planters or similar containers, need periodic watering to survive. A number of schemes have been developed over the years to assure a plant receives a continuous supply of water, while maximizing the period between watering. Many of these schemes have involved providing a pot or planter with a built-in reservoir for storing water and a mechanism for supplying the plant with a constant flow of water from the reservoir.

For example, U.S. Pat. No. 262,379 issued to E. K. Dean on Aug. 8, 1882, describes an automatic watering device comprising a container designed to collect rain water that is stored in a reservoir and planters for containing plants. The planters are positioned in the container and include tubes that project down into, and are fluidly coupled with, the reservoir of the container. Water moves up into the planter through a wick in the tube. U.S. Pat. No. 283,966 issued to E. B. Chappell on Aug. 28, 1883, discloses another variation on the concept of the planter containing a reservoir in which a tube filled with soil projects down into the reservoir of water and acts as a wick to move water up to the soil surrounding the plant. Unfortunately, the devices disclosed in these patents require use of an external reservoir surrounding the container in which the plant is planted, which in certain contexts is visually unacceptable, cannot be accommodated in the space available or is otherwise unacceptable.

Of more recent vintage is U. S. Pat. No. 4,756,121 issued to A. Wild on Jul. 12, 1988 ("the '121 patent"), which discloses an irrigation device consisting of a container that encloses a sealable reservoir for holding and dispensing water. The container has a tightly sealable opening for introducing water into the reservoir. A portion of the container wall has a concave indentation that forms a chamber which projects into the water reservoir. The chamber is open at the top and is intended to contain soil and receive a plant growing in the soil. A lower portion of this chamber has capillary dimension openings which open into the water reservoir to allow water in the reservoir to come into contact with the soil in the chamber. These openings, in effect, act as a water-air exchange mechanism allowing water to enter the soil as air enters the sealed water reservoir. The device works on the principle that, given the reservoir is sealed, and the openings between the reservoir and soil in the chamber are extremely small, the exchange of water and air is slowed and thereby prevents the soil from being water-logged. The '121 patent mentions that the device can be buried in a flower bed or flower box; however, to seal the water reservoir the opening through which water is added would have to be accessible, and thus located at or above ground level. This limits the depth to which the device can be buried in the soil.

It is known to use a tube to deliver water to a reservoir at the bottom of a pot, with the tube extending up through soil in the pot or pot liner positioned above the reservoir. See, for example, U.S. Pat. No. 5,921,025 to G. Smith ("the '025 patent"). While the device of the '025 patent is believed to function satisfactorily for its intended purpose, it suffers from an important limitation. Because the sidewall of the pot or liner in which the reservoir is received extends a substantial distance above the top or cover of the reservoir, the device of the '025 patent occupies a relatively large space. This is disadvantageous when space constraints prevent use of a relatively large watering device.

Although, the patents discussed above all disclose apparatus that continuously supply water to a plant on a regular basis, none provide a separate watering reservoir which can be used with a wide variety of planters and can be buried in a flower or vegetable garden. Nor do they describe a watering reservoir which can be unobtrusively used with a planter such that it does not affect the aesthetics created by the plant and planter.

SUMMARY OF THE INVENTION

It is an objective of the present invention to provide a watering reservoir that can be unobtrusively used with a wide variety of planters or can be buried in the ground. It is another object of the present invention to provide a watering reservoir that can be quickly and easily replenished with water.

Accordingly the present invention provides a self-watering planting reservoir for providing moisture to soil in which the reservoir is buried. The reservoir includes a container for holding water. The container has a base, a sidewall and a cover that together define an interior chamber. The cover includes a first opening and a second opening extending therethrough. No portion of the container extends beyond the cover as determined along an axis extending perpendicularly from the base toward the cover. The reservoir also includes a well attached to the cover at the second opening and configured to extend into the interior chamber. The well has an interior region in communication with the second opening so that the interior is open to space above the cover. In addition, the well includes a first bottom section that rests against the base and a second bottom section that projects up and away from the base. The second bottom section has an opening of greater than capillary dimension that couples the interior chamber with the interior region. The reservoir additionally includes a tube having an interior in fluid communication with the first opening in the cover so that water may be poured through the tube's interior into the interior chamber via the first opening and so that the interior chamber is coupled with an atmosphere proximate the container. The tube is sized so that when the reservoir is buried in soil a portion of the tube extends above the soil.

Another aspect of the invention is a method of providing water to a first space, which may be adjacent at least one plant. The method comprises as its first step providing the reservoir described above. Next, the reservoir is positioned in a first space. Then, the first space is filled with soil so that the well is filled with soil and the container is covered, but a portion of the tube extends above the soil. Finally, water is introduced into the interior region of the container through the tube on a periodic basis.

DETAILED DESCRIPTION OF THE INVENTION

Figure 1:
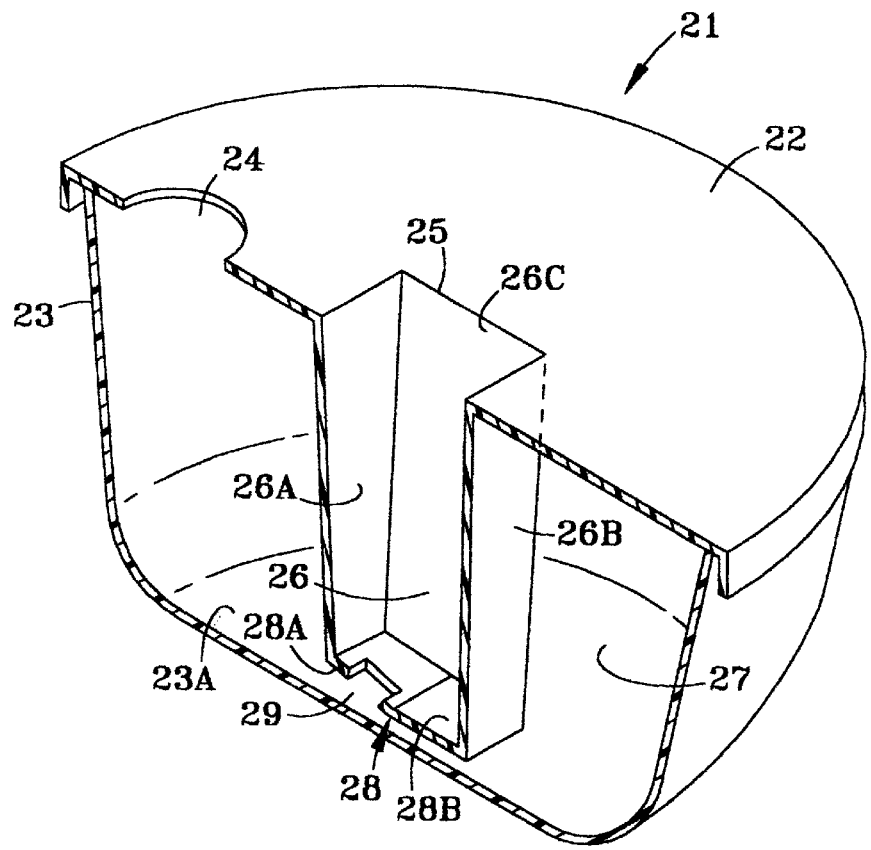
FIG. 1 is a perspective, cut-away view of the reservoir of the present invention.
Figure 2:
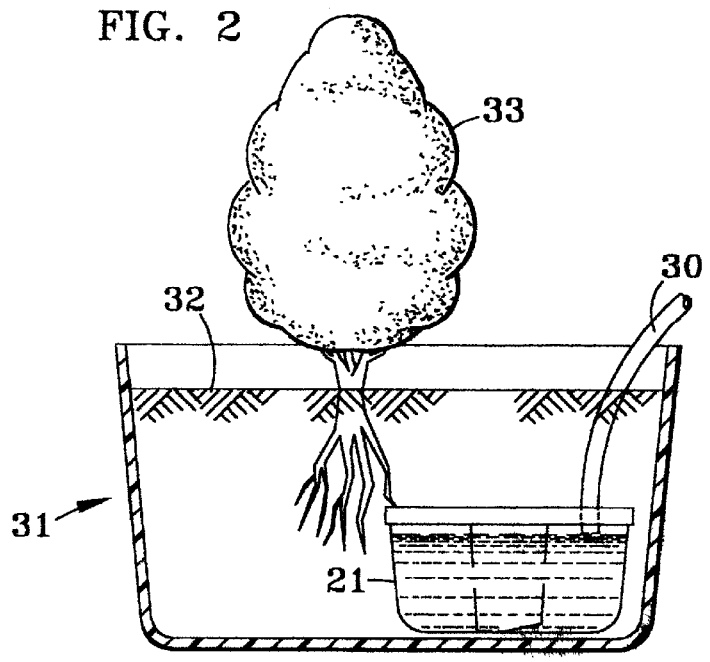
FIG. 2 is a cross-sectional side elevation view of a planter in which the reservoir of the present invention has been placed.
Figure 3:
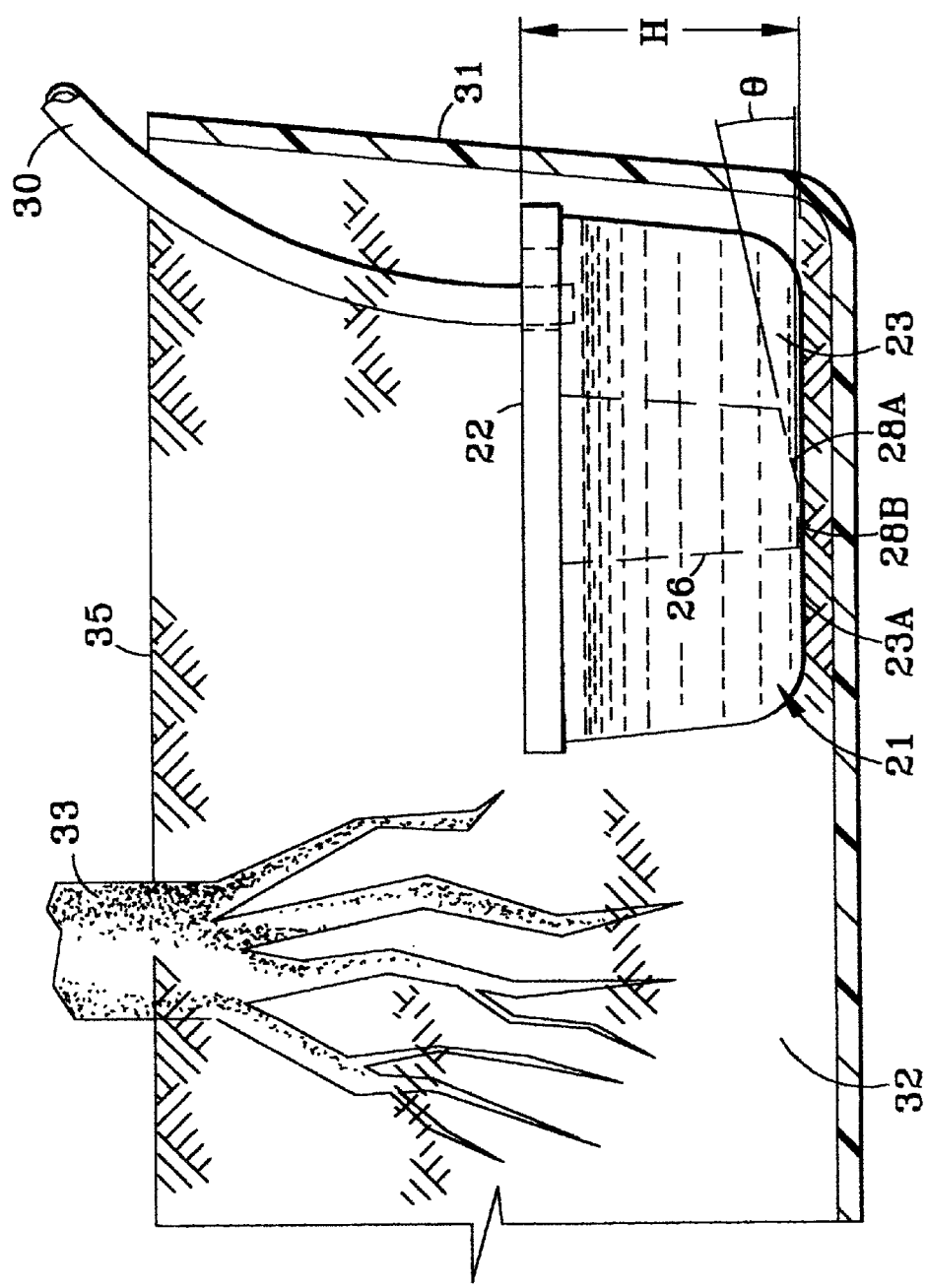
FIG. 3 is an enlarged view of a portion of FIG. 2.

Referring to FIG. 1, the present invention is a self-watering planting reservoir 21 for providing an even supply of moisture to a plant in a container or in the ground. While for convenience of illustration reservoir 21 is shown in a planter 31, it is to be appreciated that it may also be buried in the ground adjacent a plant, e.g., in a flower or vegetable garden.

Reservoir 21 includes a lid 22 and a container 23. Container 23 is cup shaped in the preferred embodiment and is designed to hold water. Lid 22 covers container 23 and may be permanently or releasably attached to the container. Lid 22 has a first opening 24 and a second opening 25.

Turning now to FIGS. 1–6, reservoir 21 also includes a well 26 having sidewalls 26A, 26B, 26C and 26D. Preferably, sidewalls 26A, 26B, 26C and 26D taper inwardly slightly, e.g., about 4 degrees inwardly, as they extend downwardly from lid 22. Although well 26 preferably has a rectangular cross section, it is to be appreciated that the well may have a circular, square, oval or other cross section. Well 26 is aligned with second opening 25 and opens out to the region proximate lid 22. Preferably, although not necessarily, well 26 is attached to lid 22. Lid 22 and container 23 are configured so that when the lid is placed on the container, a closed chamber 27 is formed within the container into which well 26 projects.

Well 26 includes a bottom 28 attached to sidewalls 26A, 26B, 26C and 26D. Bottom 28 has sections 28A and 28B. Section 28A projects up and away from bottom section 28B. The angle θ (FIG. 3) that bottom section 28A makes with floor 23A preferably ranges from 15 to 45 degrees, with an angle of about 30 degrees being used in a preferred embodiment of the present invention. Bottom section 28B is generally parallel to lid 22 and well 26 is preferably sized so that bottom section 28B rests against floor 23A of container 23.

Bottom section 28A of well 26 has an opening 29 which, as will be explained in more detail below, forms an interface between the soil in the well 26 and the water in chamber 27. Opening 29 has a cross-sectional area that is greater than the area of a hole that supports transfer of moisture by capillary action. In this regard, while the cross-sectional area of opening 29 will vary with the overall size of reservoir 21 and hence well 26, the opening typically has a cross-sectional area in the range 0.08 inches$^2$ to 0.7 inches$^2$. Generally speaking, opening 29 occupies about half of the surface area of bottom section 28A.

Reservoir 21 also includes a tube 30 sized for receipt in first opening 24. If desired, a fitting (not shown) may be provided to ensure tube 30 remains secured to lid 22. The length of tube 30 is selected so that when reservoir 21 is positioned in a planter 31 or in the ground (not shown), tube 30 projects above the surface of soil 32 on top of the reservoir. As described in more detail below, chamber 27 is coupled with the atmosphere above soil 32 via the interior of tube 30 and water may be added to the chamber via the tube.

Figure 4:
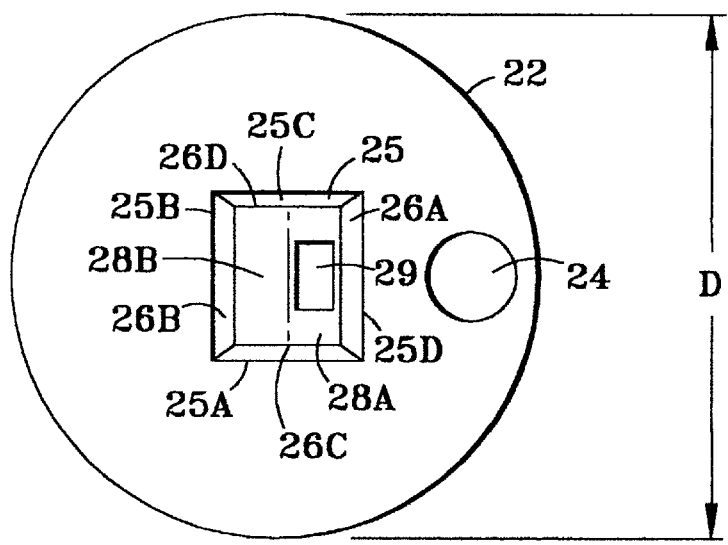
FIG. 4 is a top view of the watering reservoir of the present invention.
Figure 5:
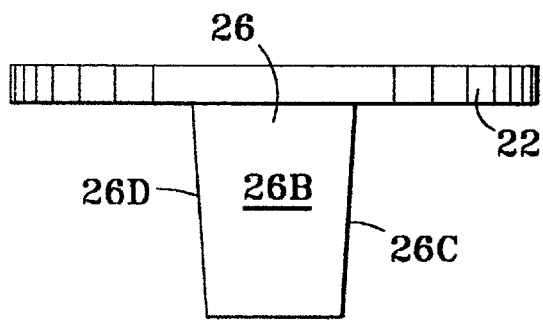
FIG. 5 is a side elevation view of the lid and well of the reservoir.
Figure 6:
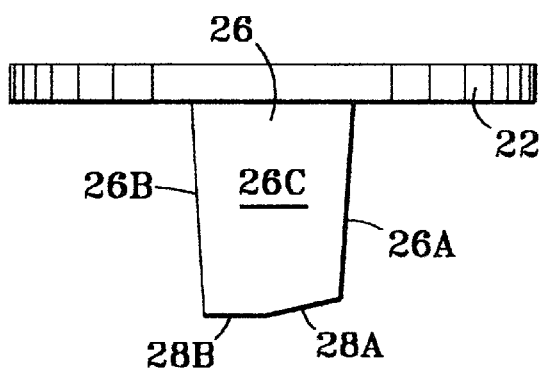
FIG. 6 is a side elevation view of the lid and well of the reservoir, taken at a perspective 90 degrees removed from the perspective of FIG. 5.

The size of reservoir 21 may be varied as a function of the size of planter 31 in which the reservoir is positioned, the desired moisture discharge per unit of time and other factors. However, in one embodiment of the invention, lid 22 and container 23 have a circular cross-sectional configuration, the diameter D (FIG. 4) of lid 22 is six inches and the height H (FIG. 3) of container 23 is three inches. These dimensions result in chamber 27 having a capacity of approximately 36 ounces. First opening 24 in lid 22 is 1.25 inches in diameter. Second opening 25 has a rectangular cross-sectional configuration and, as shown in FIG. 4, is about 1.7 inches on sides 25B and 25D, and about 1.4 inches on side 25A and 25C. The height of well 26 from the top of lid 22 to bottom section 28B is approximately three inches.

Opening 29 is about 0.4 inch by about 0.4 inch. Bottom section 28B extends upwardly relative to floor 23A so that angle θ is about 30 degrees.

Reservoir 21 is used in the following manner. First, reservoir 21 is placed at the bottom of a planter 31 before any soil 32 or plants 33 (FIGS. 2 and 3) are introduced into the planter. Alternatively, reservoir 21 may be positioned in a hole formed in the ground. Tube 30 is then inserted through first opening 24. Potting soil 32 and a plant 33 are then added to planter 31, including in well 26, so that reservoir 21 is surrounded with soil. Water is then provided through tube 34 to chamber 27, and is subsequently added to maintain a constant supply of water in the chamber.

Soil 32 in well 26 makes contact with the water present at opening 29 at bottom section 28A. Opening 29 forms an interface between soil 32 in well 26 and the water in chamber 27. Through osmosis, wicking action and perhaps other moisture-transfer mechanisms, the water in chamber 27 seeps into soil 32 in well 26 and then up into the soil in planter 31, or into adjacent soil when the reservoir is buried in the ground. As a consequence of this moisture transfer, water is delivered to plant 33 on a constant basis.

The construction of reservoir 21 affords a number of advantages. Lid 22 prevents soil 32 from entering chamber 27. By sizing tube 34 so that it extends up to surface 35 of soil 32 in planter 31, it is possible to repeatedly add water to chamber 27 without the need to dig up reservoir 21. As noted previously, bottom 28 of well 26 has two sections, bottom sections 28A and 28B. Bottom section 28A, in which opening 29 is formed, is slanted relative to floor 23A to prevent the weight of soil 32 and plants 33 from forcing the bottom section against floor 23A, thereby shutting opening 29. Bottom section 28B lies flat against floor 23A to bear the load of soil 32 and the plants 33 above it in planter 31.

Reservoir 21 is intended to be reusable. In the preferred embodiment, reservoir 21 is made of molded black polyethylene, but other types of materials could also be used. Reservoir 21 is typically designed to supply water to a planter 31 having a diameter of eight inches to twenty inches, or to a region of a garden of similar diameter. However, larger planters 31 or ground areas can be accommodated by using several reservoirs 21 in one planter or by making the reservoir sufficiently large. Thus, so long as water is present in chamber 27, reservoir 21 will constantly supply moisture to soil 32 or other media in planter 31. As plant 33 grows larger, roots will often grow down into well 26, which will encourage plant growth as soil 32 in well 26 generally has the highest moisture concentration.

While the present invention has been described in connection with a preferred embodiment, it will be understood that it is not so limited. On the contrary, it is intended to cove all alternatives, modifications and equivalents as may be included within the spirit and scope of the invention as defined in the appended claims.

What is claimed is:

1. A self-watering planting reservoir for providing moisture to soil in which the reservoir is buried, the reservoir comprising:
   a. a container for holding water, said container having a base, a sidewall and a cover that together define an interior chamber, said cover including a first opening and a second opening extending therethrough, wherein no portion of said container extends beyond said cover as determined along an axis extending perpendicularly from said base toward said cover;
   b. a well extending into said interior chamber, said well having an interior region in communication with said second opening so that said interior region is open to space above said cover, said well further including a first bottom section that rests against said base and a second bottom section that projects up and away from said base, said second bottom section having an opening of greater than capillary dimension that couples said interior chamber with said interior region; and
   c. a tube having an interior in fluid communication with said first opening in said cover so that water may be poured through said interior into said interior chamber via said first opening and so that said interior chamber is coupled with an atmosphere proximate the reservoir, said tube being sized so that when the reservoir is buried in soil a portion of said tube extends above the soil.

2. A reservoir according to claim 1, wherein the opening in said second bottom section has an area that ranges from 0.08 inches$^2$ to 0.7 inches$^2$.

3. A reservoir according to claim 1, wherein said second bottom section projects up and away from said first bottom section so as to form an angle with said base of said container ranging from 15 to 45 degrees.

4. A reservoir according to claim 1, wherein said well is attached to said cover.

5. A reservoir according to claim 1, wherein said cover is attached to said sidewall.

6. A reservoir according to claim 1, wherein said cover is releasably attached to said sidewall.

7. A method of providing water to a first space, the method comprising the steps of:
   a. providing a reservoir according to claim 1;
   b. placing said reservoir in a first space;
   c. filling said first space with soil so that said well is filled with soil and said container is covered, but a portion of said tube extends above said soil; and
   d. introducing water into said interior region of said container through said tube on a periodic basis.

8. A method according to claim 7, further including the step of planting a plant in said soil adjacent said first space other than in said well.

9. A method according to claim 7, wherein said first space is within a receptacle.

10. A method according to claim 7, wherein said first space is in the ground.

* * * * *